United States Patent
Kanakeshan et al.

(10) Patent No.: US 11,544,091 B2
(45) Date of Patent: Jan. 3, 2023

(54) DETERMINING AND IMPLEMENTING RECOVERY ACTIONS FOR CONTAINERS TO RECOVER THE CONTAINERS FROM FAILURES

(71) Applicant: HEWLETT PACKARD ENTERPRISE DEVELOPMENT LP, Houston, TX (US)

(72) Inventors: K. Kanakeshan, Bangalore (IN); Vaishnavi Rajagopal, Bangalore (IN); Paresh Sao, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 103 days.

(21) Appl. No.: 16/504,425

(22) Filed: Jul. 8, 2019

(65) Prior Publication Data
US 2021/0011749 A1    Jan. 14, 2021

(51) Int. Cl.
*G06F 9/455* (2018.01)
*G06F 11/30* (2006.01)
*G06F 11/07* (2006.01)

(52) U.S. Cl.
CPC ...... *G06F 9/45558* (2013.01); *G06F 11/0793* (2013.01); *G06F 11/3006* (2013.01); *G06F 2009/45575* (2013.01); *G06F 2009/45591* (2013.01)

(58) Field of Classification Search
None
See application file for complete search history.

(56) References Cited

U.S. PATENT DOCUMENTS

| | | | |
|---|---|---|---|
| 9,323,628 B2 | 4/2016 | Ngo et al. | |
| 10,379,922 B1* | 8/2019 | Bell | G06F 11/0793 |
| 2013/0157644 A1* | 6/2013 | Berg | H04W 40/02 |
| | | | 455/418 |
| 2016/0371127 A1* | 12/2016 | Antony | G06F 9/505 |
| 2017/0093923 A1 | 3/2017 | Duan | |
| 2017/0103003 A1* | 4/2017 | Jin | G06F 11/203 |
| 2017/0199770 A1 | 7/2017 | Peteva et al. | |
| 2017/0357555 A1* | 12/2017 | Saitoh | G06F 9/485 |

(Continued)

OTHER PUBLICATIONS

Wasson, M. et al., "Designing Resilient Applications for Azure," Dec. 18, 2018, https://docs.microsoft.com/en-us/azure/architecture/resiliency/.

(Continued)

*Primary Examiner* — Meng Ai T An
*Assistant Examiner* — Zujia Xu
(74) *Attorney, Agent, or Firm* — Nolte Lackenbach Siegel

(57) ABSTRACT

A system may include a registration module to register the system with a server cluster and a resource collector module operatively connected to the registration module, the resource collector module to identify a list of resources for a container running on the server cluster. The system may also include a resource monitor module operatively connected to the resource collector module, the resource collector module to receive the list of resources for the container, monitor a resource in the list of resources for the container, and generate an event for the container and an event manager module operatively connected to the resource monitor module, the event manager to receive the event and determine a recovery action for the container.

18 Claims, 7 Drawing Sheets

(56) References Cited

U.S. PATENT DOCUMENTS

| | | | |
|---|---|---|---|
| 2018/0173567 A1 | 6/2018 | Olshefski et al. | |
| 2018/0336351 A1* | 11/2018 | Jeffries | H04L 63/101 |
| 2018/0352417 A1* | 12/2018 | Butler | H04W 8/10 |
| 2018/0358122 A1* | 12/2018 | Raghotham Venkat | G16H 10/60 |
| 2019/0220361 A1* | 7/2019 | Mageswaran | G06F 11/302 |
| 2020/0034177 A1* | 1/2020 | Geldart | G06F 9/45558 |
| 2020/0036575 A1* | 1/2020 | Palavalli | G06F 11/2046 |
| 2020/0304297 A1* | 9/2020 | Radhakrishnan | H04L 63/0442 |
| 2020/0327006 A1* | 10/2020 | Khanna | G06F 11/0736 |
| 2020/0344299 A1* | 10/2020 | Sohail | H04L 47/821 |

OTHER PUBLICATIONS

Watts, S., "Docker Monitoring: How to Monitor Containers and Microservices," Jul. 7, 2017, https://www.bmc.com/blogs/docker-monitoring-explained-monitor-containers-microservices/.

* cited by examiner

DETERMINING AND IMPLEMENTING RECOVERY ACTIONS FOR CONTAINERS TO RECOVER THE CONTAINERS FROM FAILURES

BACKGROUND

Containers are an example of a deployment model for micro-service architecture approaches to application deployment. In computing environments, containers may be used to package code so an application may run reliably when moved between computing environments. Depending on the intended uses for applications running in the containers, the containers may be designed to provide high availability and allow load balancing thereby improving application availability within a computing environment, Containers may also be monitored to determine application functionality within the computing environment.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
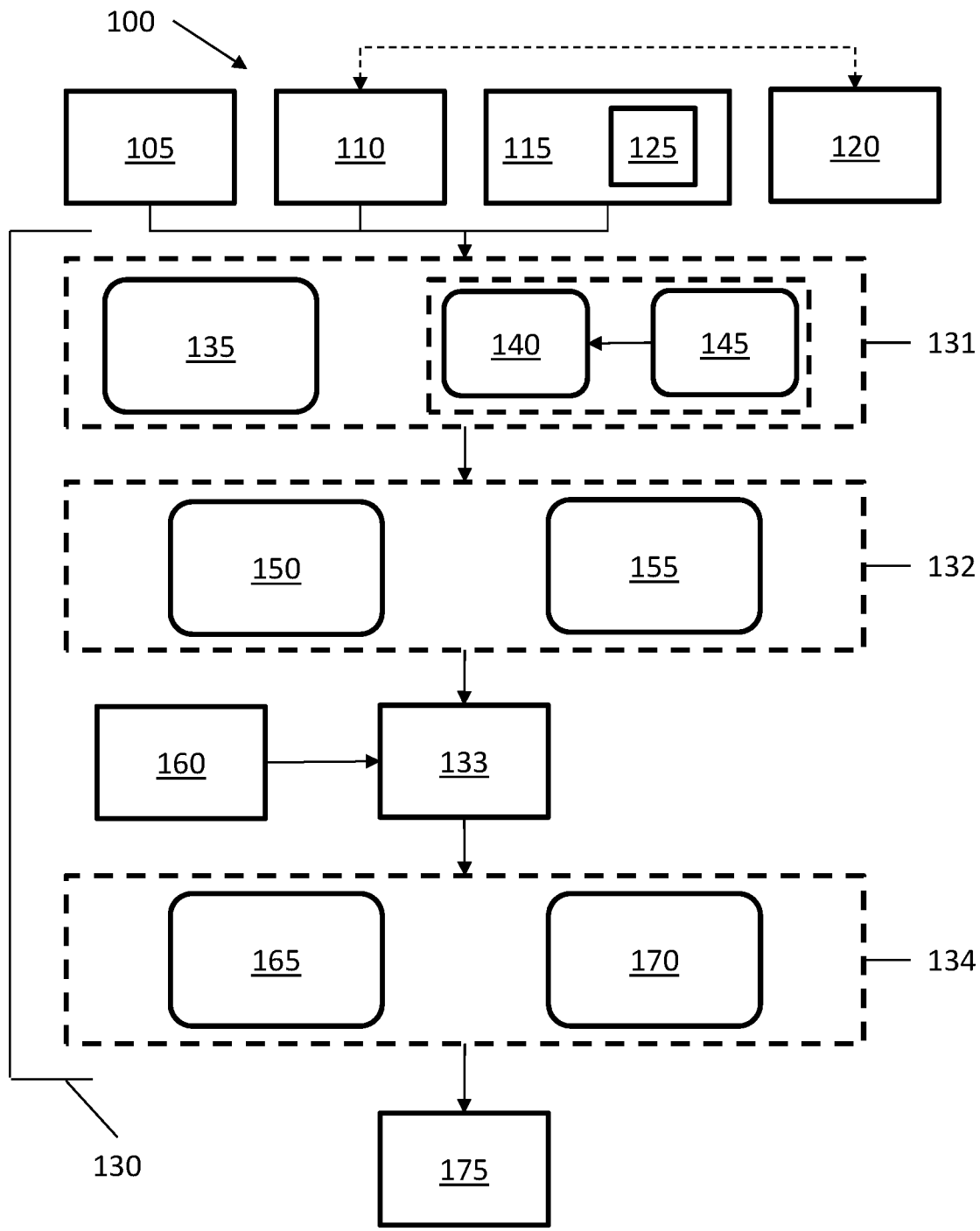
FIG. 1 is a schematic representation of a system for monitoring a computing environment, according to one or more examples of the disclosure.

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Further, as used herein, the article "a" is intended to have its ordinary meaning in the patent arts, namely "one or more." Herein, the term "about" when applied to a value generally means within the tolerance range of the equipment used to produce the value, or in some examples, means plus or minus 10%, or plus or minus 5%, or plus or minus 1%, unless otherwise expressly specified. Further, herein the term "substantially" as used herein means a majority, or almost all, or all, or an amount with a range of about 51% to about 100%, for example. Moreover, examples herein are intended to be illustrative only and are presented for discussion purposes and not by way of limitation.

As briefly explained above, containers may be used to deploy applications in a computing environment. Such containers are designed to provide high availability and load balancing and, to provide such high availability and load balancing, the containers may be monitored. The containers may be monitored to determine whether the containers are currently running or stopped. If the container is stopped, the container may be restarted on a different node, such as a different computing device, virtual machine, or the like. Restarting the container on a different node may be generally referred to as a failover. Such failover operations may result in application unavailability for a period of time, thereby resulting in downtime for systems and users.

Examples provided in the present disclosure may increase application availability in containers by decreasing the number of failover operations that occur. Rather than failover a container when a problem is detected, examples disclosed herein may monitor the container and when a problem is identified determine whether a solution other than a failover may occur. If another solution is identified, the solution may be attempted prior to performing the failover, thereby decreasing the amount of application downtime.

In certain implementations, the system including the containers and associated applications may be monitored at multiple levels. For example, the system may be monitored at the host level. A host level failure may occur as a result of network, storage device, or other hardware failures. In certain implementations, the infrastructure of the host may be corrected rather than performing a failover. In another example, the system may be monitored at the container level.

A container failure may occur as a result of a modification to the container daemon or when the daemon is hung. Rather than perform a failover, the container daemon may be restarted, preventing application unavailability. In still another example, the system may be monitored at the application level. An application failure may occur when the application is not responding as intended. For example, an application may become hung due to resource deadlock, at which point certain functionality may become unavailable. Rather than perform a failover, the application may be restarted, thereby decreasing the amount of downtime that may occur as a result of restarting the container.

Example implementations of the present disclosure may thereby allow for the monitoring of computing systems at multiple levels to allow recovery actions to be performed prior to restarting containers. By decreasing the number of container restarts, system functionality and application uptime may be increased, thereby increasing system and user experience. Examples of such systems and methods are described in detail below.

Turning to FIG. 1, a schematic representation of a system for monitoring a computing environment, according to one or more examples of the disclosure is shown. System 100 may include components of a server cluster and may include an operating system 105, a container daemon 110, and a cluster solution 115. Operating system 105 may include any type of software that supports system 100 functions, such as scheduling tasks, executing application, controlling devices, and the like. Example operating systems may include, for example, UNIX, Linux, Microsoft Windows Server, Mac OSX, and any other software solution capable of supporting system 100. In certain implementations, operating system 105 may control aspects of system 100, thereby allowing component modules discussed below to function.

Container daemon 110 may use a client-server architecture to communicate with a container 120. Container daemon 110 may thereby build, run, and otherwise distribute one or more containers 120 of system 100. In certain implementations, container daemon 110 may be part of system 100, while in other implementations, container daemon 110 may operate remotely, and thus run on a separate computing device.

Cluster solution 115 may refer to software tools that monitor the status of containers 120. For example, cluster solution 115 may determine whether specific containers 120 are running, stopped, or experiencing certain problems. As such, cluster solution 115 may determine whether particular events are occurring within one or more containers 120 and communicate such information to other aspects of system 100, such as operating system 105. Cluster solution 115 may further include a representational state transfer application program interface ("REST API") 125. REST API 125 may provide a set of routines, protocols, and tools defining how software components of system 100 interact.

System 100 may further include a number of modules that run on system 100 as a stand-alone daemon. Modules discussed herein may refer to software, hardware, or a combination thereof, which provides specific functionality, which will be discussed below with respect to specific modules. Thus, a solution module 130 including a registration module 131, a resource collector module 132, a resource monitor module 133, and an event manager module 134, may run as a stand-alone daemon that runs on system 100 and access components of system 100 to monitor a computing environment thereof. The individual modules of solution module 130 are discussed individually in detail below.

Solution modules 130 may include registration module 131. Registration module 131 may be operatively connected to operating system 105, container daemon 110, cluster solution 115, and/or other components of system 100. Registration module 131 may include an auto register 135, such that when installed, registration module 131 may communicate with cluster solution 115 via, for example, REST API 125. Registration may thereby allow other modules to access information about containers 120. For example, after registration, cluster solution 115 logs, operating system 105 logs, container daemon 110 logs, and other information within system 100 may be available to solution module 130. In certain implementations, registration module 131 may further include a user register 140 and a template 145. When auto registration is not available, due to, for example, presence of a unique cluster solution 115, a user register 140 may allow a user to provide commands that may be used to provide actions by solution module 130 within system 100. To provide user registration, a user may access and fill in template 145, thereby registering solution module 130 with system 100.

Solution module 130 may further include resource collector module 132. Resource collector module 132 may be operatively connected to registration module 131. Resource collector module 132 may thereby identify a list of resources for container 120 that is running on system 100 and determine which resources are to be monitored. The determination of which resources to monitor may occur as a result of prioritizing the resources based on levels or tiers of importance for system 100 functionality. For example, higher priority resources may be monitored, while lower priority resources may not be monitored in some examples.

Resource collector module 132 may include a metadata reader 150 and a user interface 155. Metadata reader 150 may interact with container 120, by, for example, accessing a configuration file (not shown) of container 120. The configuration file may include information on the resources and/or details about containers 120 of system 100. Metadata reader 150 may thereby read metadata contents for container 120, which is hosting particular applications, and based on the metadata, determine a list of resources to be monitored for an application. For example, the resources to be monitored may include internet protocols, storage details, volume information, file system structure, data files, eta Thus, the infrastructure and resource information for an application (not shown) on container 120 may be identified and marked for monitoring. As this identification process may occur automatically, user input may be reduced or prevented, thereby allowing for the independent identification of resource information for applications on container 120.

Resource collector module 132 may further include a user interface 155. User interface 155 may allow users to add, delete, or otherwise modify information about resources to be monitored. For example, users may define resources such as specific process names or scripts to be monitored. As such, application-specific monitoring may be provided, as users can customize specific resources to be monitored if the resources are not explicitly identified by metadata reader 150.

Solution module 130 may further include resource monitor module 133. Resource monitor module 133 may be operatively connected to resource collector module 132 and may receive a list of resources for container 120. Resource monitor module 133 may further include or otherwise be operatively connected to a monitoring tool 160 that may thereby allow resource monitor module 133 to monitor one or more resources identified in the list of resources for container 120 and generate or otherwise identify an event for container 120, system 100, or components thereof. Events may include failure events that represent a failure of one or more of hardware and software components of system 100, such as, for example, applications, containers 120, hosts, and the like. Monitoring tool 160 may include inbuilt monitoring that allows system 100 metrics and incidents to be monitored based on the identified resources. As monitoring tool 160 may be either integrated in resource monitor module 133 or a separate module, monitoring tool 160 may be adjusted or otherwise replaced with a different monitoring tool 160 should operational conditions of system 100 and/or container 120 change. As such, resource monitor module 133 may be adapted to changing operational conditions.

Solution module 130 may further include event manager module 134. Event manager module 134 may be operatively connected to resource monitor module 133 and may receive an event and determine a recovery action for container 120. Event manager module 134 may also be operatively connected to other components of system 100, thereby allowing event manager module 134 to identify certain events without input from resource monitor module 133. Event manager module 134 may include an event filter 165 and an event machine 170. Event filter 165 may filter events that it receives from resource monitor module 133 and send certain events to event machine 170. Event filter 165 may also independently identify events in container 120 and/or other components of system 100.

In operation, event filter 165 may register with one or more operating system daemons (not shown), such as a syslog daemon, in order to identify operating system 105 and/or kernel level events. Further, event filter 165 may register with container daemon 110 to receive container events, and/or with cluster solution 115 to receive cluster solution events. Registration may thereby allow event filter 165 to access logs (not shown) corresponding to operating system 105, container daemon 110, and/or cluster solution 115 to determine when events occur. In certain implementations, the events received or otherwise determined by event filter may be predefined events that are activated when they occur. As such, event filter 165 may include a list of events, and when the events are activated, the event filter may send the events to event machine 170.

In other implementations, event filter 165 may receive events from resource monitor module 133. The events received from resource monitor module 133 may include new events that are determined by resource monitor module 133. For example, if a new container 120 is spawned or an existing container 120 is deleted, an event may be generated, monitored by resource monitor module 133, and sent to event filter 165. Event filter 165 may then update its list (not shown) of containers 120 to manage and monitor. As such, event filter 165 may maintain an updated list (also not shown) of containers 120 and/or events to filter when events occur or are otherwise activated.

Event machine 170 may include a set of rules (not shown) off of which to generate specific actions, such as the recovery actions mentioned above. The recovery actions may be specific for events, and as such, when an event occurs, event machine 170 may determine a recovery action for the event to allow container 120 to recover from a failure. In certain implementations, event machine 170 may provide notifications to users or other system components of the event and/or a recovery action for the event. The recovery actions may be passed to an interface module 175.

Interface module 175 provides communication between cluster solution 115 and/or operating system 105, which allows communication between computing hardware, such as servers, containers 120, applications, and/or other components of or connected to system 100. Interface module 175 provides instructions to other components of system 100 to implement the recovery actions. For example, the recovery action may be implemented by cluster solution 115 by calling the application programming interface (not shown) identified by cluster solution 115 or identified in template 145, as provided by a user. As such, the initial registration of solution module 130 may allow recovery actions to be performed automatically in response to identification of an event having a corresponding recovery action. To initiate the recovery action, interface module 175 may communicate with other components of system 100 through, for example, Rest API, driver-based communications, secure shell protocols, and the like.

System 100 may include additional components, ether hardware or software. For example, system 100 may include more than one container 120, each of which is connected to one or more container daemons 110. Additionally, more than one cluster solution 115 may be included and the connectivity between solution module 130 and one or more of operating system 103, container daemon 110, cluster solution 115, and/or container 120 may be different than that disclosed herein. Accordingly, solution module 130 may be operatively connected to each component of system 100, whether directly or indirectly, thereby allowing each module of the solution module 130 to access or otherwise receive information from each of the components of system 100.

Example implementations of system 100 and solution module 130 will be discussed below with respect to a container failure, a host failure, and an application failure. The examples may thereby provide an explanation of the process flow of solution module 130 during operation.

Figure 2:
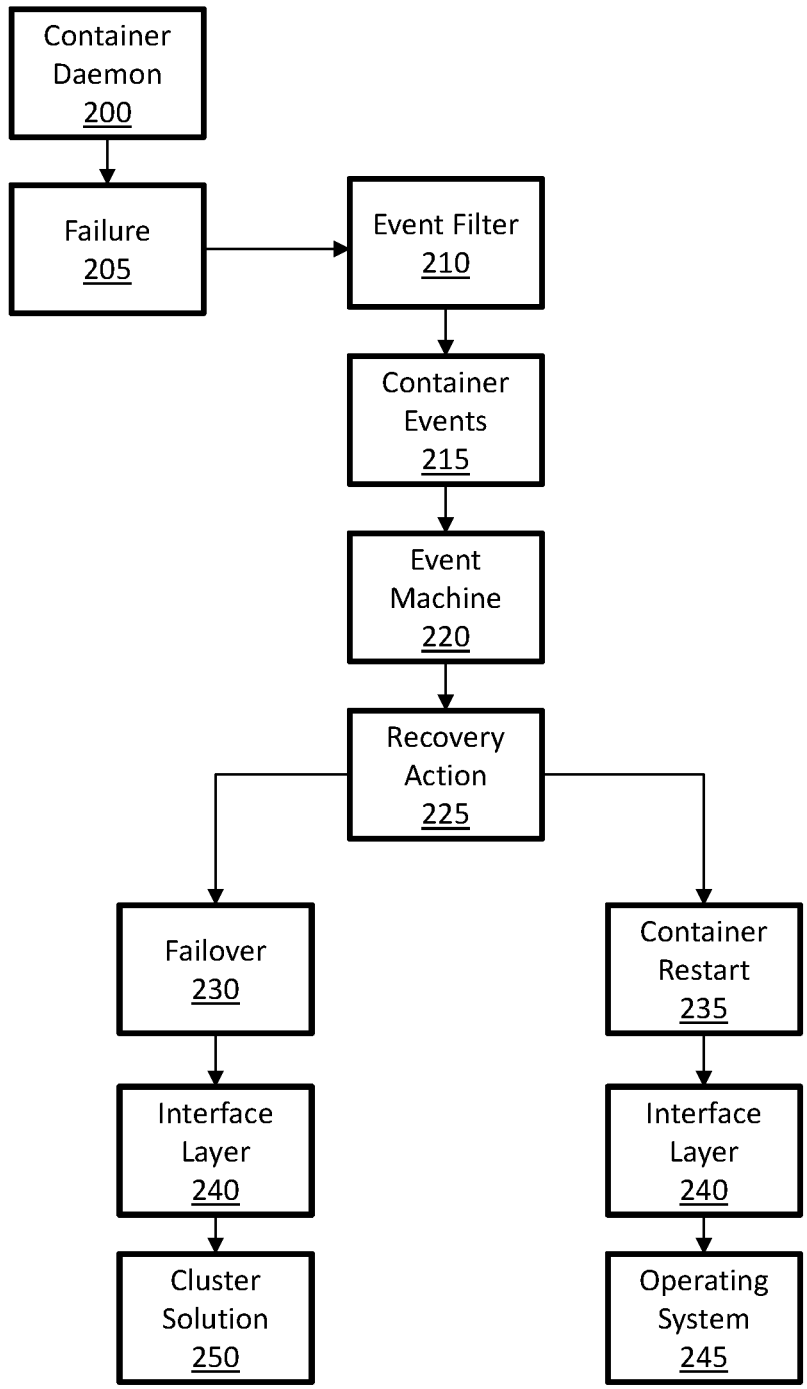
FIG. 2 is a flowchart depicting a method for responding to a container failure within a computing environment, according to one or more examples of the disclosure that may be practiced with the system of FIG. 1.

Turning to FIG. 2, a flowchart depicting a method for responding to a container failure within a computing environment, according to one or more examples of the disclosure is shown. In this implementation, a container daemon 200 may experience a hang or have otherwise crashed. Such container failures may occur as a result of user error or environmental factors. Such container failures may be recorded in operating system, kernel, or container logs (not shown). The process flow for detecting the failure and determining a recovery action is discussed below.

Initially, container daemon 200 may experience a failure 205. The failure is identified by an event filter 210 as a container event 215, and the container event 215 is passed on to event machine 220. Event machine 220 associates the container event 215 with a recovery action 225. Because the event is identified as a container event 215, in this implementation, the recovery action 225 may be to either initiate a failover 230 or a container daemon restart 235.

Initially, the recovery action 225 of container daemon restart 235 may be attempted. To restart the container the recovery action 225 of container daemon restart 235 may be provided to interface layer 240, which may send notification of the container daemon restart 235 to operating system 245. Operating system 245 may then restart the container. If the container (not shown) comes up and the failure event does not reoccur, then the recovery action may be terminated, as the container is functioning without experiencing a failure 205. While interface layer 240 is represented as two different boxes in the present flowchart, example implementations may include a single interface layer 240, multiple interface layers 240, or other ways of sending information to one or more of cluster solution 250 and/or operating system 245.

If the container comes up and the failure event is detected a second time, event filter 210 may send notification to event machine 220 of the event, and event machine 220 can generate a different recovery action 225. In this implementation, if the container daemon restart 235 does not rectify the event, the recovery action 225 generated by event machine 220 may be a failover 230. To initiate the failover 230, the failover 230 recovery action 225 may be sent to interface layer 240, which communicates to a cluster solution 250. Cluster solution 250 may then, either directly or indirectly, provide instructions to perform the failover 230, and the container may be restarted on a separate node (not shown). For example, cluster solution 250 may perform the failover or operating system 245 may perform the failover.

In certain implementations, rather than automatically perform failover 230, notification may be sent to a user, alerting the user of the situation, thereby allowing the user to determine which recovery action to perform. By providing a recovery action 225 option of restarting the container, less application downtime may occur, as restarting the container may occur more quickly than moving the container to a separate node during failover 230.

Figure 3:
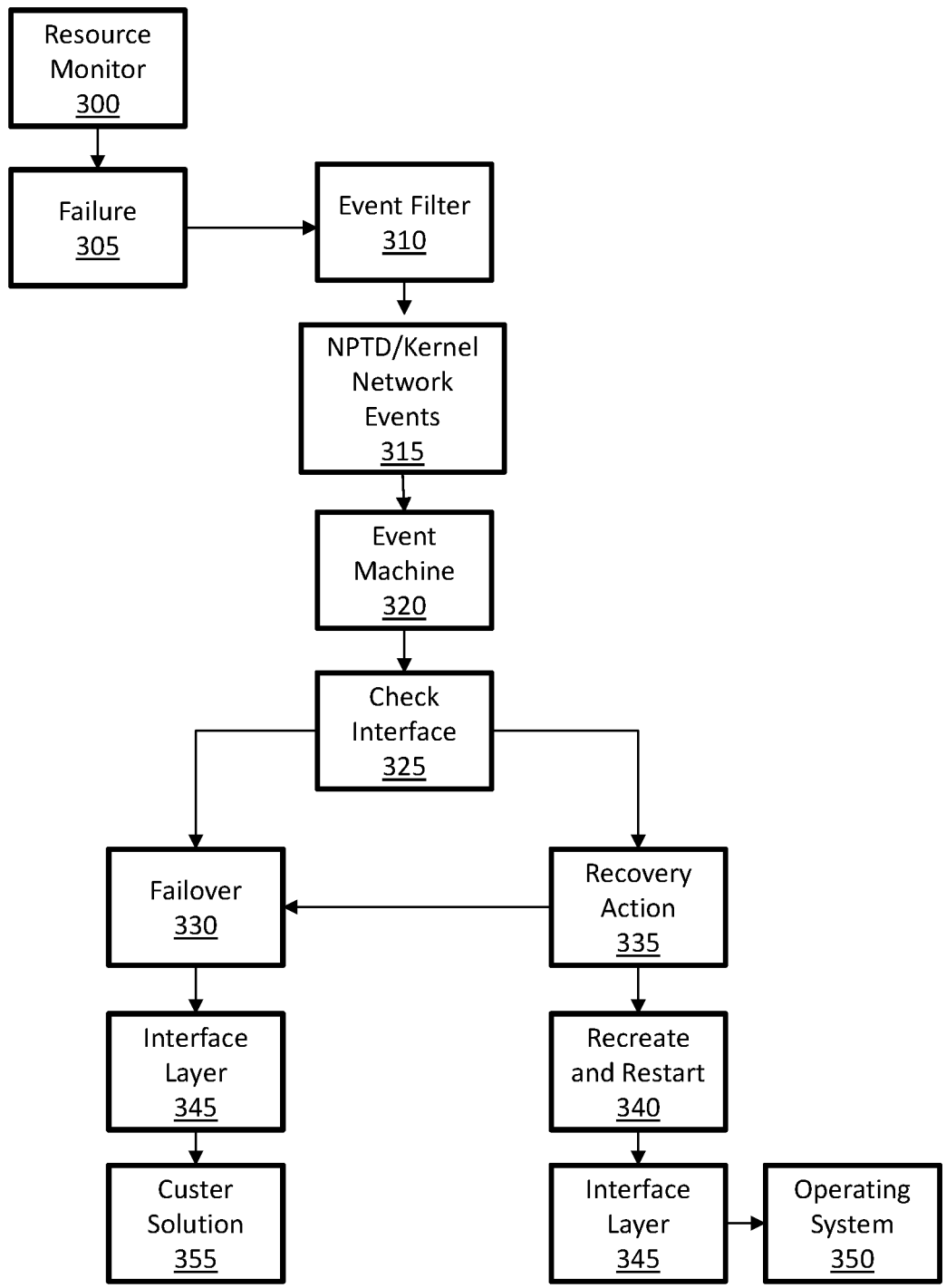
FIG. 3 is a flowchart depicting a method for responding to a host failure within a computing environment, according to one or more examples of the disclosure that is alternative to the method of FIG. 2 and may be practiced with the system of FIG. 1.

Turning to FIG. 3, a flowchart depicting a method for responding to a host failure within a computing environment, according to one or more examples of the disclosure. In this implementation, a network bridge (not shown) on a system (also not shown) hosting an application (not shown) may fail. When a network bridge fails, the reason for the failure may be either physical or virtual. In this implementation, rather than restart the container on a new node, the reason for the failure may be identified and other actions may be performed, as will be explained in the process flow described below.

Resource monitor 300 may collect and maintain metadata of various containers and container configurations and specifications. Additionally, resource monitor 300 may monitor the resources associated with the containers. In this example, a failure 305 occurs, which in this example may be a network bridge failure or another type of host failure. An event may be logged in one of the logs (not shown) accessible by event filter 310. For example, the event may be logged in an operating system log, such as syslog, as described above with respect to FIG. 1. Upon receiving the event, event filter 310 may send an identified network time protocol daemon ("NTPD") network event or any other standard kernel network event message 315 to the event machine 320. Event machine 320 may then generate an action message based on the event, i.e., the network bridge failure.

As there are both physical and virtual reasons the failure 305 may have occurred, prior to implementing an action, notification of the event and the optional recovery actions may be sent to an interface 325, and event machine 325 may check its rules to determine what action to take. If the identified failure 305 is physical, the action failover 330 may be performed. If the identified failure 305 is in the virtual interface, then the recovery action 335 may be to recreate and restart 340 the same bridge and network. If recreating and restarting 340 the bridge and network does not remove the event, recovery action 335 may include recreating and restarting 340 the container. For simplicity in process flow, the steps of recreating and restarting are illustrated jointly at process flow box 340. As described above, to recreate and restart 340 instructions of the recovery action 335 may be provided to interface layer 345, which may contact an appropriate system component, such as operating system 350.

If the recreate and restart 340 still returns the event, event machine 320 may indicate to check interface 325 that the event is still occurring and a failover 330 may be performed. As described above, to initiate the failover 330, the failover 330 instructions may be sent to interface layer 345, which communicates to a cluster solution 355. Cluster solution 355 may then, either directly or indirectly, provide instructions to perform the failover 330, and the container (not shown) may be restarted on a separate node (also not shown). For example, cluster solution 355 may perform the failover 330 or operating system 350 may perform the failover.

Other system components may include both physical and virtual events, which may be handled in a multi-step process. For example, if a storage failure occurs, the recovery action may include reattaching or reconfiguring a storage volume (not shown), If the recovery action 335 removes the event, then failover 330 may be prevented. By prevent unnecessary failover 330 operations, application uptime may be maintained.

Additionally, failures 305 may result in the fencing of nodes and eventual loss of part of the cluster of hosts. In such a situation, only a part of the cluster survives due to the fencing. By identifying and reconfiguring the virtual network rather than performing a failover 330, the host issue may be corrected before cluster split occurs. As such, applications may continue to run, and resources are not wasted.

Figure 4:
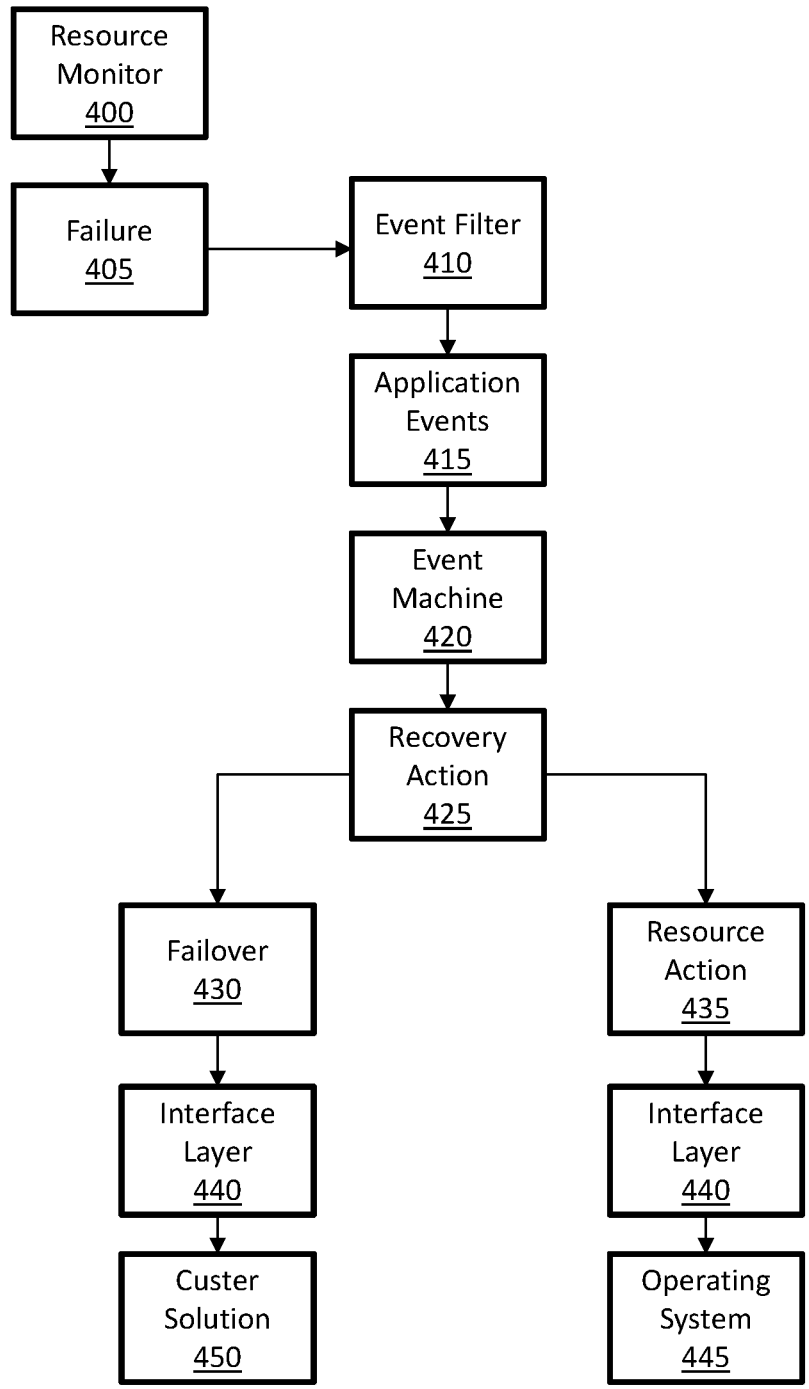
FIG. 4 is a flowchart depicting a method for responding to an application failure within a computing environment, according to one or more examples of the disclosure that is alternative to the methods of FIG. 2 and FIG. 3 and may be practiced with the system of FIG. 1.

Turning to FIG. 4, a flowchart depicting a method for responding to a hung application due to a resource deadlock within a computing environment, according to one or more examples of the disclosure. In this implementation, an application has become hung due to a resource deadlock. In this implementation, rather than restart a container (not shown) running the application on a new node (not shown), the reason for the application becoming hung may be identified and other actions may be performed, as will be explained in the process flow described below.

In this implementation, a resource monitor 400 may generate a failure 405 in response to an event occurring identifying an application as not performing as intended. To generate the failure 405, a resource monitor 400 may analyzing monitoring tool messages and/or container metadata logs collected and passed to resource the monitor 400 by a resource collector. The event may then be sent to or otherwise identified by an event filter 410 as an application event 415. The application event 415 may be sent from the event filter 410 to an event machine 420, and the event machine 420 may identify a recovery action 425 that corresponds to the application event 415.

As failure 405 is identified as an application event 415, recovery action 425 may include failover 430 or a resource action 435. Initially, the recovery action 425 of resource action 435 may be attempted, which may include, for example, restarting the application on the same host. To restart the application, the recovery action 425 of resource action 435 may be provided to interface layer 440, which may send notification of the resource action 435 to operating system 445. Operating system 445 may then restart the application. If the application comes up and the event does not occur, then the action may be terminated, as the application is functioning without experiencing a failure.

If the application comes up and the event is detected a second time, event filter 410 may send notification to event machine 420 of the event, and event machine 420 can generate a different recovery action. In this implementation, if the resource action 435 does not rectify the event, the recovery action 425 generated by event machine 420 may be a failover 430. To initiate the failover 430, the failover 430 recovery action 425 may be sent to interface layer 440, which communicates to a cluster solution 450. Cluster solution 450 may then, either directly or indirectly, provide instructions to perform the failover 430, and the container may be restarted on a separate node. For example, cluster solution 450 may perform the failover 430 or operating system 445 may perform the failover 430.

In certain implementations, rather than automatically perform failover 430, notification may be sent to a user, alerting the user of the situation, thereby allowing the user to determine which recovery action 425 to perform. By providing a recovery action 425 option of restarting the application, less application downtime may occur, as restarting the application may occur more quickly than moving the application to a separate node during failover 430.

Figure 5:
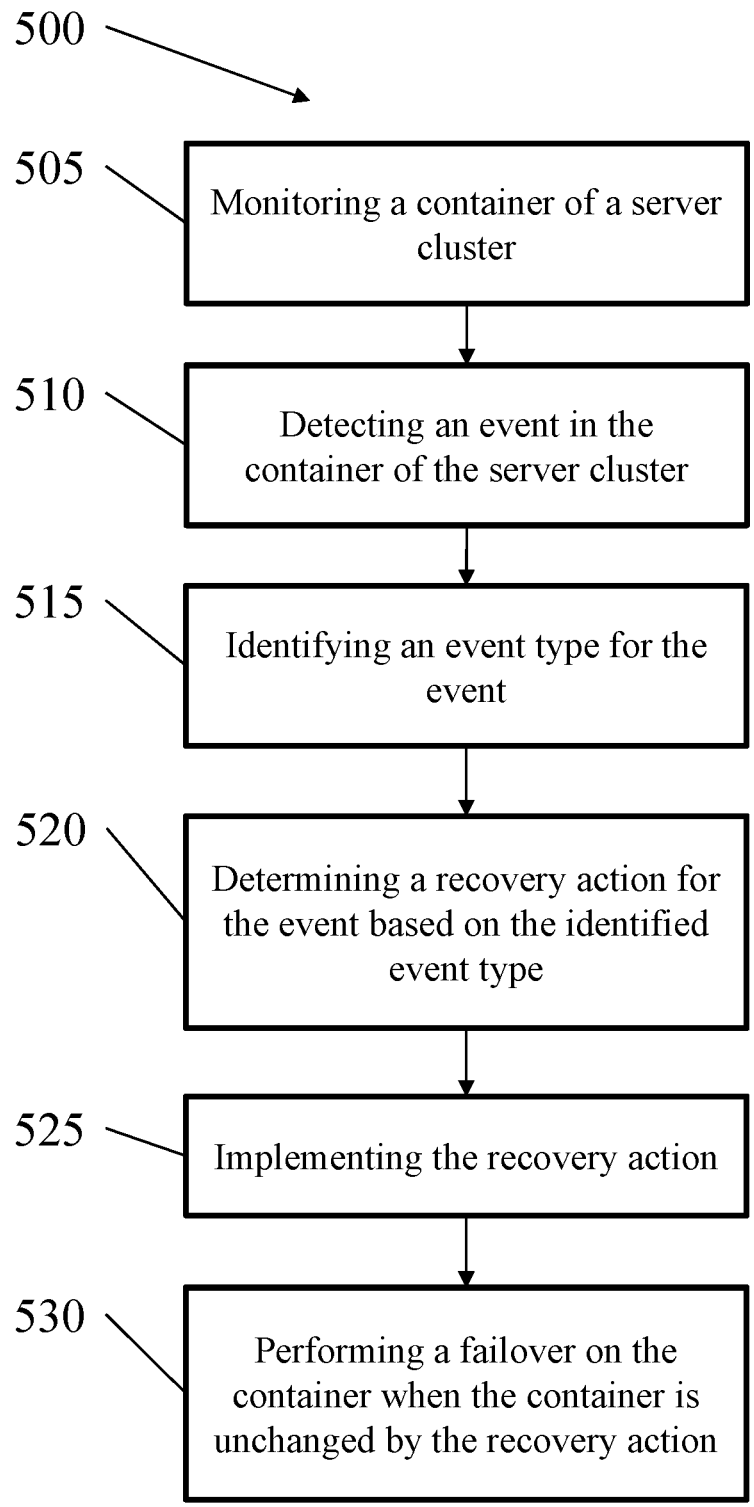
FIG. 5 is a flowchart depicting a method for monitoring a computing environment, according to one or more examples of the disclosure.

Turning to FIG. 5, a flowchart depicting a method for monitoring a computing environment, according to one or more examples of the disclosure. In operation, method 500 may include monitoring (block 505) a container of a server cluster. The monitoring may include using one or more modules of a solution module, as discussed above with respect to FIG. 1. For example, a resource collector module may monitor one or more components of the server cluster, such as aspects of an operating system, a container daemon, a cluster solution, a container, and/or logs associated therewith. Additionally, in certain implementations, the monitoring may include using a resource monitor module to identify changes that may occur within the container and/or the system. Also, an event manager module having, for example, an event filter, may be used to monitor one or more aspects of container and/or system; as explained with respect to FIG. 1.

Method 500 may further include detecting (block 510) an event in the container of the server cluster. The event may be detected using, for example, a resource collector module, a resource monitor module, and/or an event manager module. In certain implementations, the event manger module may include an event filter that has a list of events that may be activated when a matching event if detected. Similarly, resource monitor module may be configured to identify new events that occur due to, for example, changes to the container, an application, and/or other aspects of the system.

Method 500 may further include identifying (block 515) an event type for the event. The identifying may include determining, based on the event, whether the event represents a host failure, a container failure, or an application failure. The identification may occur through use of an event manager module and/or other components of the solution module.

Method 500 may further include determining (block 520) a recovery action for the event based on the identified event type. The recovery action may be based on the type of event, as well as the specific event that is identified. For example, event manager module may include a list of recovery actions for specific events. When an event occurs, the event manager may identify one or more recovery actions identified for the event. For example, a recovery action may include a container restart, an application restart, reconfiguring or resetting aspects of containers, application, and systems, including both software and hardware components, as well as performing a failover.

Method 500 may further include implementing (block 525) the recovery action. Implementation of the recovery action may include instituting any of the recovery actions identified above, as well as other recovery actions that may be specific to individual events and/or event types. Implementing the recovery action may include interfacing with a cluster solution and/or an operating system, thereby allowing aspects of the system to perform the recovery action.

Method 500 may further include performing (block 530) a failover on the container when the container is unchanged by the recovery action. The failover may be performed when the recovery action does not change the event, and as such, the event may continue to be detected one or more times after a recovery action occurs. In certain implementations, two or more recovery actions may be performed before a failover is performed. During a failover, the container may be relocated to a different node, and applications running on the container may be restarted.

In addition to the operational process described above, method 500 may include automatically registering a solution module daemon with the server cluster, which may include automatically registering the solution module with a cluster solution, as explained in detail with respect to FIG. 1. Method may further include identifying a plurality of resources of the server cluster and monitoring the resources to allow for the detecting the event in the container of the server cluster. In certain implementations, the events may include one or more of a predefined event and a new event.

Figure 6:
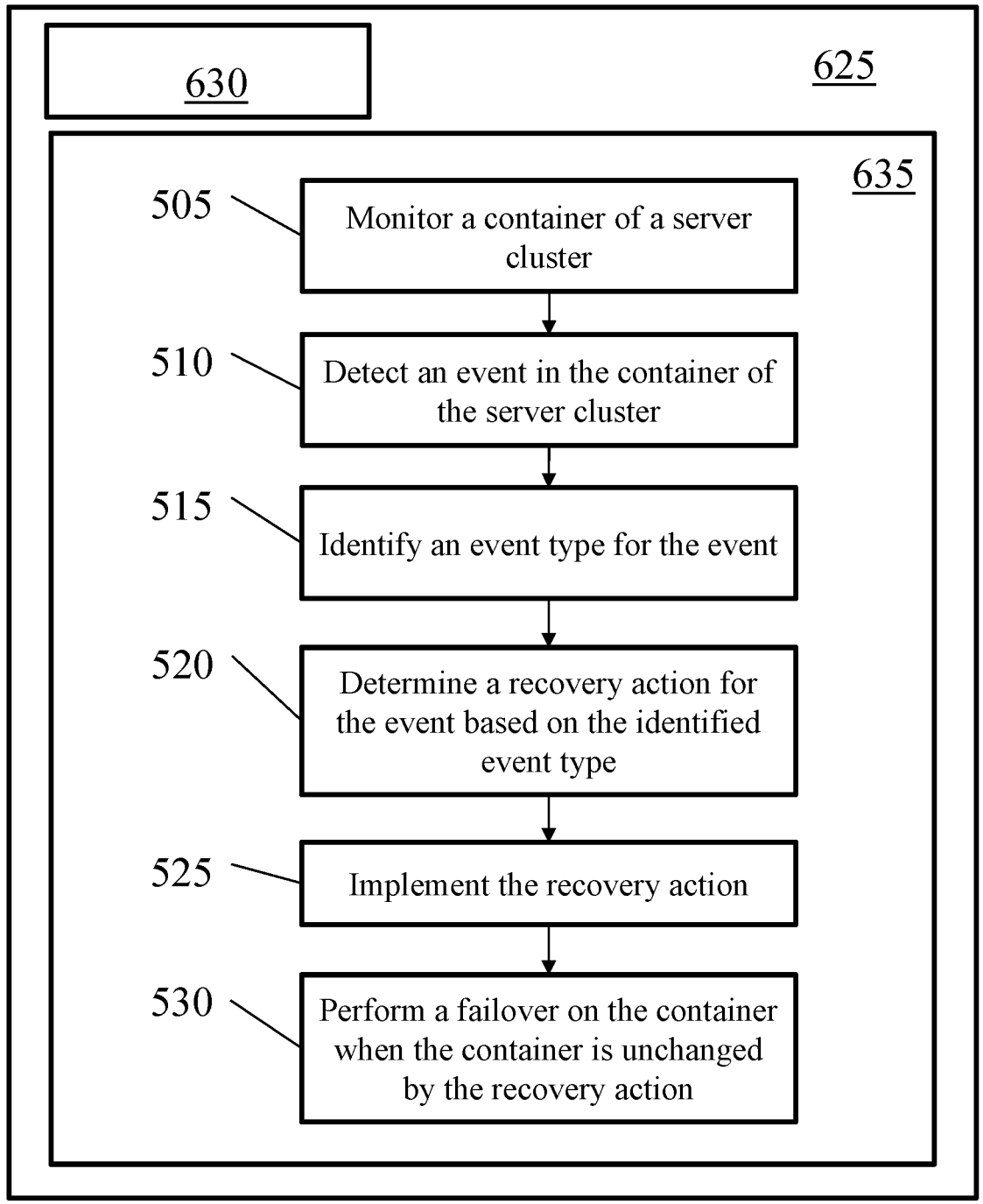
FIG. 6 is an example computing device with a hardware processor and accessible machine-readable instructions, according to one or more examples of the disclosure. The computing device of FIG. 6 is one particular example of a computing device with which the method of FIG. 5 may be performed.

Turning to FIG. 6, an example computing device with a hardware processor and accessible machine-readable instructions is shown in accordance with one or more examples of the present disclosure. FIG. 6 provides an example computing device 625, with a processing resource 630, and accessible machine-readable instructions stored on a machine-readable medium 635 for generating information about a product as discussed above with respect to one or more disclosed example implementations. FIG. 6 illustrates computing device 625 configured to perform the flow described in blocks 505, 510, 515, 520, 525, and 530 discussed in detail with respect to FIG. 5. However, computing device 625 may also be configured to perform the flow of other methods, techniques, functions, or processes described in this disclosure.

A machine-readable storage medium, such as 635 of FIG. 6, may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory ("EPROM"), random access memory ("RAM"), non-volatile random access memory ("NVRAM"), optical disk, solid state drive ("SSD"), flash memory chips, and the like. The machine-readable storage medium may be a non-transitory storage medium, where the term "non-transitory" does not encompass transitory propagating signals.

Figure 7:
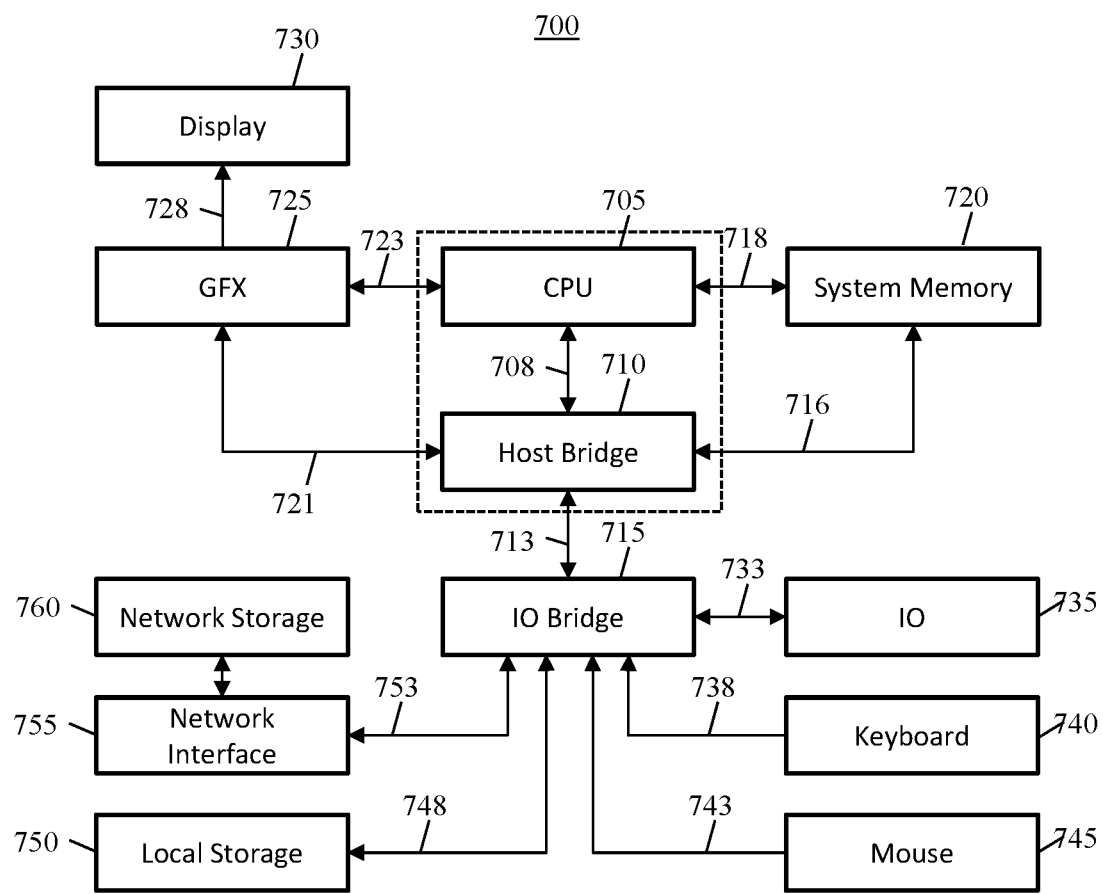
FIG. 7 is a schematic representation of a computer processing device that may be used to implement functions and processes, according to one or more examples of the present disclosure, according to one or more examples of the disclosure.

Turning now to FIG. 7, a schematic representation of a computer processing device 700 that may be used to implement functions and processes in accordance with one or more examples of the present disclosure is shown. FIG. 7 illustrates a computer processing device 700 that may be used to implement the systems, methods, and processes of this disclosure. For example, computer processing device 700 illustrated in FIG. 7 could represent a client device or a physical server device and include either hardware or virtual processor(s) depending on the level of abstraction of the computing device. In some instances (without abstraction), computer processing device 700 and its elements, as shown in FIG. 7, each relate to physical hardware. Alternatively, in some instances one, more, or all of the elements could be implemented using emulators or virtual machines as levels of abstraction. In any case, no matter how many levels of abstraction away from the physical hardware, computer processing device 700 at its lowest level may be implemented on physical hardware.

FIG. 7 shows a computer processing device 700 in accordance with one or more examples of the present disclosure. Computer processing device 700 may be used to implement aspects of the present disclosure, such as an orchestrator, a gateway manager, a cloud monitor, a local storage, a cloud-based storage, or any other device that may be used implementing the systems and methods for managing data discussed herein. Computer processing device 700 may include one or more central processing units (singular "CPU" or plural "CPUs") 705 disposed on one or more printed circuit boards (not otherwise shown). Each of the one or more CPUs 705 may be a single-core processor (not independently illustrated) or a multi-core processor (not independently illustrated). Multi-core processors typically include a plurality of processor cores (not shown) disposed on the same physical die (not shown) or a plurality of processor cores (not shown) disposed on multiple die (not shown) that are collectively disposed within the same mechanical package (not shown). Computer processing device 700 may include one or more core logic devices such as, for example, host bridge 710 and input/output ("IO") bridge 715.

CPU 705 may include an interface 708 to host bridge 710, an interface 718 to system memory 720, and an interface 723 to one or more IO devices, such as, for example, graphics processing unit ("GFX") 725. GFX 725 may include one or more graphics processor cores (not independently shown) and an interface 728 to display 730. In certain examples, CPU 705 may integrate the functionality of GFX 725 and interface directly (not shown) with display 730. Host bridge 710 may include an interface 708 to CPU 705, an interface 713 to 10 bridge 715, for examples where CPU 705 does not include interface 718 to system memory 720, an interface 716 to system memory 720, and for examples where CPU 705 does not include integrated GFX 725 or interface 723 to GFX 725, an interface 721 to GFX 725. One of ordinary skill in the art will recognize that CPU 705 and host bridge 710 may be integrated, in whole or in part, to reduce chip count, motherboard footprint, thermal design power, and power consumption. 10 bridge 715 may include an interface 713 to host bridge 710, one or more interfaces 733 to one or more IO expansion devices 735, an interface 738 to keyboard 740, an interface 743 to mouse 745, an interface 748 to one or more local storage devices 750, and an interface 753 to one or more network interface devices 755.

Each local storage device 750 may be a solid-state memory device, a solid-state memory device array, a hard disk drive, a hard disk drive array, or any other non-transitory computer readable medium. Each network interface device 755 may provide one or more network interfaces including, for example, Ethernet, Fibre Channel, WiMAX, Wi-Fi®, Bluetooth®, or any other network protocol suitable to facilitate networked communications. Computer processing device 700 may include one or more network-attached storage devices 760 in addition to, or instead of, one or more local storage devices 750. Network-attached storage device 760 may be a solid-state memory device, a solid-state memory device array, a hard disk drive, a hard disk drive array, or any other non-transitory computer readable medium. Network-attached storage device 760 may or may not be collocated with computer processing device 700 and may be accessible to computer processing device 700 via one or more network interfaces provided by one or more network interface devices 755.

One of ordinary skill in the art will recognize that computer processing device 700 may include one or more application-specific integrated circuits ("ASICs") that are configured to perform a certain function, such as, for example, hashing (not shown), in a more efficient manner. The one or more ASICs may interface directly with an interface of CPU 705, host bridge 710, or IO bridge 715. Alternatively, an application-specific computing system (not shown), sometimes referred to as mining systems, may be reduced to only those components necessary to perform the desired function, such as hashing via one or more hashing ASICs, to reduce chip count, motherboard footprint, thermal design power, and power consumption. As such, one of ordinary skill in the art will recognize that the one or more CPUs 705, host bridge 710, 10 bridge 715, or ASICs or various sub-sets, super-sets, or combinations of functions or features thereof, may be integrated, in whole or in part, or distributed among various devices in a way that may vary based on an application, design, or form factor in accordance with one or more example examples. As such, the description of computer processing device 700 is merely exemplary and not intended to limit the type, kind, or configuration of components that constitute a computing system suitable for performing computing operations, including, but not limited to, hashing functions. Additionally, one of ordinary skill in the art will recognize that computer processing device 700, an application-specific computing system (not shown), or combination thereof, may be disposed in a stand-alone, desktop, server, or rack mountable form factor.

One of ordinary skill in the art will recognize that computer processing device 700 may be a cloud-based server, a server, a workstation, a desktop, a laptop, a netbook, a tablet, a smartphone, a mobile device, and/or any other type of computing system in accordance with one or more example examples.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A system comprising:
    at least one hardware processor;
    a hardware component;
    a plurality of modules run on the system as a solution module, wherein the plurality of modules includes a registration module, a resource collector module, a resource monitor module, and an event manager module, wherein the registration module is coupled to the resource collector module and the resource monitor module, and wherein the event manager module is coupled to the resource monitor module;
    a memory to store instructions that, when executed by the at least one hardware processor, cause the at least one hardware processor to:
    register, by the registration module, the system with a server cluster;
    identify, by the resource collector module, a list of resources for a container running on the server cluster;
    receive, by the resource monitor module, the list of resources for the container from the resource collector module;
    monitor, by the resource monitor module, a resource in the list of resources for the container;
    generate, by the resource monitor module, an event for the container, wherein the event corresponds to a failure of the hardware component;

receive, by the event manager module, the event from the resource monitor module;

determine, by the event manager module, a cause attributable to the failure based on the received event, wherein the determination comprises determining a virtual reason for the failure of the hardware component; and responsive to the cause being the virtual reason for the failure of the hardware component:

determine a first recovery action for the container based on the received event, wherein the first recovery action comprises restarting the hardware component;

implement the first recovery action to recover the container, wherein implementing the first recovery action comprises restarting the hardware component; and implement a second recovery action to recover the container in response to the event reoccurring responsive to the implementation of the first recovery action, wherein implementing the second recovery action comprises restarting the container.

2. The system of claim 1, wherein the instructions, when executed by the at least one hardware processor, further cause the at least one hardware processor to:

communicate at least one of the first recovery action and the second recovery action for the container to at least one of a clustering software or an operating system.

3. The system of claim 1, wherein the instructions, when executed by the at least one hardware processor, further cause the at least one hardware processor to:

access the container and read a container metadata to identify the list of resources for the container.

4. The system of claim 3, wherein the instructions, when executed by the at least one hardware processor, further cause the at least one hardware processor to:

receive the list of resources for the container and to provide additional resources to be monitored.

5. The system of claim 1, wherein the instructions, when executed by the at least one hardware processor, further cause the at least one hardware processor to:

apply an event filter to identify the event.

6. The system of claim 1, wherein the instructions, when executed by the at least one hardware processor, further cause the at least one hardware processor to:

automatically register the system with the server cluster.

7. A method comprising:

registering a system, by a registration module, with a server cluster, wherein the system comprising at least one hardware processor, a hardware component, a number of modules run on the system as a solution module that including: the registration module, a resource collector module, a resource monitor module, and an event manager module, wherein the registration module is coupled to the resource collector module and the resource monitor module, wherein the event manager module coupled to the resource monitor module;

identifying, by the resource collector module, a list of resources for a container running on the server cluster;

receiving, by the resource monitor module, the list of resources for the container from the resource collector module;

monitoring, by the resource monitor module, the container of the server cluster, wherein the container is associated with a container daemon;

detecting, by the resource monitor module, an event for the container, wherein the event corresponds to a failure of the hardware component of the server cluster;

receiving, by the event manager module, the event from the resource monitor module;

identifying, by the event manager module, an event type for the received event, wherein identifying the event type comprises determining, by the event manager module, a cause attributable to the failure of the hardware component based on the received event, wherein the determination comprises determining a virtual reason for the failure of the hardware component; and responsive to the cause being the virtual reason for the failure of the hardware component:

determining a first recovery action for the received event based on the identified event type, wherein the first recovery action comprises restarting the hardware component;

implementing the first recovery action to recover the container, wherein implementing the first recovery action comprises restarting the hardware components; and implementing a second recovery action to recover the container in response to the event reoccurring responsive to the implementation of the first recovery action, wherein implementing the second recovery action comprises restarting the container.

8. The method of claim 7, wherein the container runs on a first node of the server cluster, the method further comprising:

implementing a third recovery action to recover the container in response to the event reoccurring responsive to the implementation of the second recovery action, wherein implementing the third recovery action comprises performing a failover operation to run the container on a second node of the server cluster.

9. The method of claim 7, further comprising registering automatically a solution module daemon with the server cluster.

10. The method of claim 7, further comprising identifying a plurality of resources of the server cluster and monitoring the resources to allow for the detecting the event in the container of the server cluster.

11. The method of claim 7, further comprising identifying a new event and adding the new event to a list of events.

12. The method of claim 7, wherein detecting the event comprises detecting a problem in a virtual interface associated with the container.

13. A non-transitory computer readable medium comprising computer executable instructions stored thereon that, when executed by a processor in a system, cause the processor to:

register the system, by a registration module, with a server cluster, wherein the system comprising a hardware component, a number of modules run on the system as a solution module that including: the registration module, a resource collector module, a resource monitor module, and an event manager module, wherein the registration module is coupled to the resource collector module and the resource monitor module, wherein the event manager module coupled to the resource monitor module;

identify, by the resource collector module, a list of resources for a container running on the server cluster;

receive, by the resource monitor module, the list of resources for the container from the resource collector module;

monitor, by a resource monitor module, a container of the server cluster;

detect, by the resource monitor module, an event for the container, where the event corresponds to a failure of the hardware component of the server cluster;

receive, by the event manager module, the event from the resource monitor module;

determine, by the event manager module, a cause attributable to the failure of the hardware component based on the received event, wherein the determination comprises determining a virtual reason for the failure of the hardware component; and responsive to the cause being the virtual reason for the failure of the hardware component:

determine a first recovery action for the container based on the received event, wherein the first recovery action comprises restarting the hardware component;

implement the first recovery action to recover the container, wherein implementing the first recovery action comprises restarting the hardware component; and implement a second recovery action to recover the container in response to the event occurring responsive to the implementation of the first recovery action, wherein implementing the second recovery action comprises restarting the container.

14. The non-transitory computer readable medium of claim 13, wherein the container runs on a first node of the server cluster, and the instructions, when executed by the processor, further cause the processor to implement a third recovery action to recover the container in response to the event reoccurring, responsive to the implementation of the second recovery action, wherein implementing the third recovery action comprises performing a failover operation to cause the container to run on a second node of the server cluster.

15. The non-transitory computer readable medium of claim 13, wherein the hardware component comprises a bridge, and the instructions, when executed by the processor, further cause the processor to implement the first recovery action to restart the bridge.

16. The non-transitory computer readable medium of claim 13, wherein the instructions further cause the processor to identify a plurality of resources of the server cluster and monitor the resources to allow for the detecting the event in the container of the server cluster.

17. The non-transitory computer readable medium of claim 13, wherein the instructions further cause the processor to access the container to read a container metadata to identify a list of resources to be monitored.

18. The non-transitory computer readable medium of claim 13, wherein the instructions further cause the processor to detect the event based on a performance of the container.

* * * * *